US012309897B2

(12) United States Patent
Heishi et al.

(10) Patent No.: US 12,309,897 B2
(45) Date of Patent: May 20, 2025

(54) LEAF-FILTERED SUNLIGHT SIMULATION CONTROL DEVICE

(71) Applicant: Mitsubishi Electric Corporation, Tokyo (JP)

(72) Inventors: Akinori Heishi, Tokyo (JP); Satoru Okagaki, Tokyo (JP); Haruka Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/863,339

(22) PCT Filed: May 16, 2022

(86) PCT No.: PCT/JP2022/020320
§ 371 (c)(1),
(2) Date: Nov. 6, 2024

(87) PCT Pub. No.: WO2023/223372
PCT Pub. Date: Nov. 23, 2023

(65) Prior Publication Data
US 2025/0113423 A1 Apr. 3, 2025

(51) Int. Cl.
*H05B 47/10* (2020.01)
*F21V 14/02* (2006.01)
*F21V 14/06* (2006.01)
*H05B 47/155* (2020.01)
*H05B 47/16* (2020.01)

(52) U.S. Cl.
CPC ........... *H05B 47/155* (2020.01); *F21V 14/02* (2013.01); *F21V 14/06* (2013.01); *H05B 47/16* (2020.01)

(58) Field of Classification Search
CPC .... H05B 47/10; H05B 47/105; H05B 47/155; H05B 47/16; H05B 45/10; F21V 14/02; F21V 14/06; F21S 11/002
See application file for complete search history.

(56) References Cited

U.S. PATENT DOCUMENTS

2004/0046489 A1* 3/2004 Vetorino ................. F21V 13/04 313/113
2012/0106151 A1 5/2012 Vissenberg et al.
(Continued)

FOREIGN PATENT DOCUMENTS

CN 111936788 A * 11/2020 ............... F21K 9/62
JP H08-167481 A 6/1996
(Continued)

OTHER PUBLICATIONS

Korean Office Action issued Oct. 29, 2024, in corresponding Korean Patent Application No. 10-2024-7029607, 8pp.
(Continued)

*Primary Examiner* — Jimmy T Vu
(74) *Attorney, Agent, or Firm* — XSENSUS LLP

(57) ABSTRACT

A leaf-filtered sunlight simulation control device includes a plurality of light sources, a single lens, and a leaf-filtered sunlight light source control module to control positions of the plurality of light sources. The leaf-filtered sunlight light source control module controls the positions of the plurality of light sources so that F<A is satisfied, where F is a focal length of the lens and A is a distance from a center axis of the lens to each of the light sources.

10 Claims, 16 Drawing Sheets

(56) References Cited

U.S. PATENT DOCUMENTS

| | | | |
|---|---|---|---|
| 2018/0149336 | A1 | 5/2018 | Tsai et al. |
| 2018/0347771 | A1 | 12/2018 | Ansems et al. |

FOREIGN PATENT DOCUMENTS

| | | | |
|---|---|---|---|
| JP | 2858009 | B2 | 2/1999 |
| JP | 2002-299078 | A | 10/2002 |
| JP | 3149789 | U | 4/2009 |
| JP | 3189414 | U | 3/2014 |
| JP | 2017-103061 | A | 6/2017 |
| JP | 2020-173916 | A | 10/2020 |
| JP | 2021-036538 | A | 3/2021 |
| JP | 2021-077609 | A | 5/2021 |
| KR | 101659718 | | 9/2016 |

OTHER PUBLICATIONS

Japanese Office Action issued Nov. 12, 2024, in corresponding Japanese Patent Application No. 2024-521388, 3pp.

International Search Report and Written Opinion mailed on Jul. 5, 2022, received for PCT Application PCT/JP2022/020320, filed on May 16, 2022, 10 pages including English Translation.

* cited by examiner

LEAF-FILTERED SUNLIGHT SIMULATION CONTROL DEVICE

CROSS-REFERENCE TO RELATED APPLICATION

This application is a national stage application, pursuant to 35 U.S.C. § 371, of International Patent Application No. PCT/JP2022/020320, filed May 16, 2022, the entire contents of which are incorporated herein by reference.

TECHNICAL FIELD

The present disclosure relates to a leaf-filtered sunlight simulation control device.

BACKGROUND ART

In general, there has been proposed an illumination apparatus capable of creating lighting effects like sunshine filtering through the leaves using a plurality of lenses (see, for example, Patent Reference 1).

PRIOR ART REFERENCE

Patent Reference

Patent Reference 1: Japanese Utility Model Registration No. 3149789

SUMMARY OF THE INVENTION

Problem to be Solved by the Invention

The conventional technique requires the use of multiple lenses and therefore has the problem of increasing the size of the apparatus.

It is an object of the present disclosure to provide a leaf-filtered sunlight simulation control device capable of simulating sunshine filtering through the leaves with a simple configuration.

Means of Solving the Problem

A leaf-filtered sunlight simulation control device according to an aspect of the present disclosure includes: a single lens; a plurality of light sources arranged in parallel with a center axis, the center axis being orthogonal to an optical axis of the lens; and a leaf-filtered sunlight light source control module to control positions of the plurality of light sources, wherein the leaf-filtered sunlight light source control module controls the positions of the plurality of light sources to satisfy $F<A$, where F is a focal length of the lens and A is a distance from the center axis to each of the light sources.

Effects of the Invention

The present disclosure can provide a leaf-filtered sunlight simulation control device capable of simulating sunshine filtering through the leaves with a simple configuration.

MODE FOR CARRYING OUT THE INVENTION

First Embodiment

Figure 1:
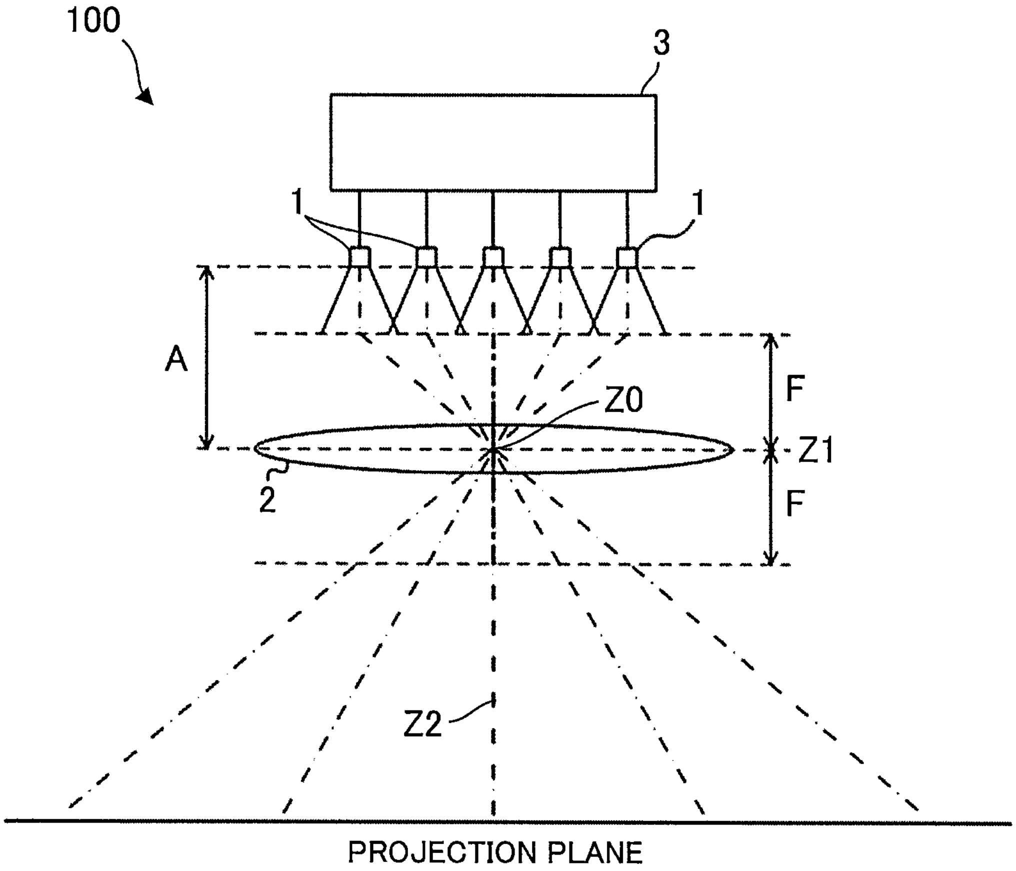
FIG. 1 is a diagram schematically illustrating a leaf-filtered sunlight simulation control device according to a first embodiment of the present disclosure.

FIG. 1 is a diagram schematically illustrating a leaf-filtered sunlight simulation control device 100 according to a first embodiment of the present disclosure.

The leaf-filtered sunlight simulation control device 100 includes a plurality of light sources 1, a single lens 2 allowing light beams from the plurality of light sources 1 to pass through the single lens 2, and a leaf-filtered sunlight light source control module 3 that controls positions of the plurality of light sources 1. The plurality of light sources 1 will also be collectively referred to as a "light source unit."

Figure 2:
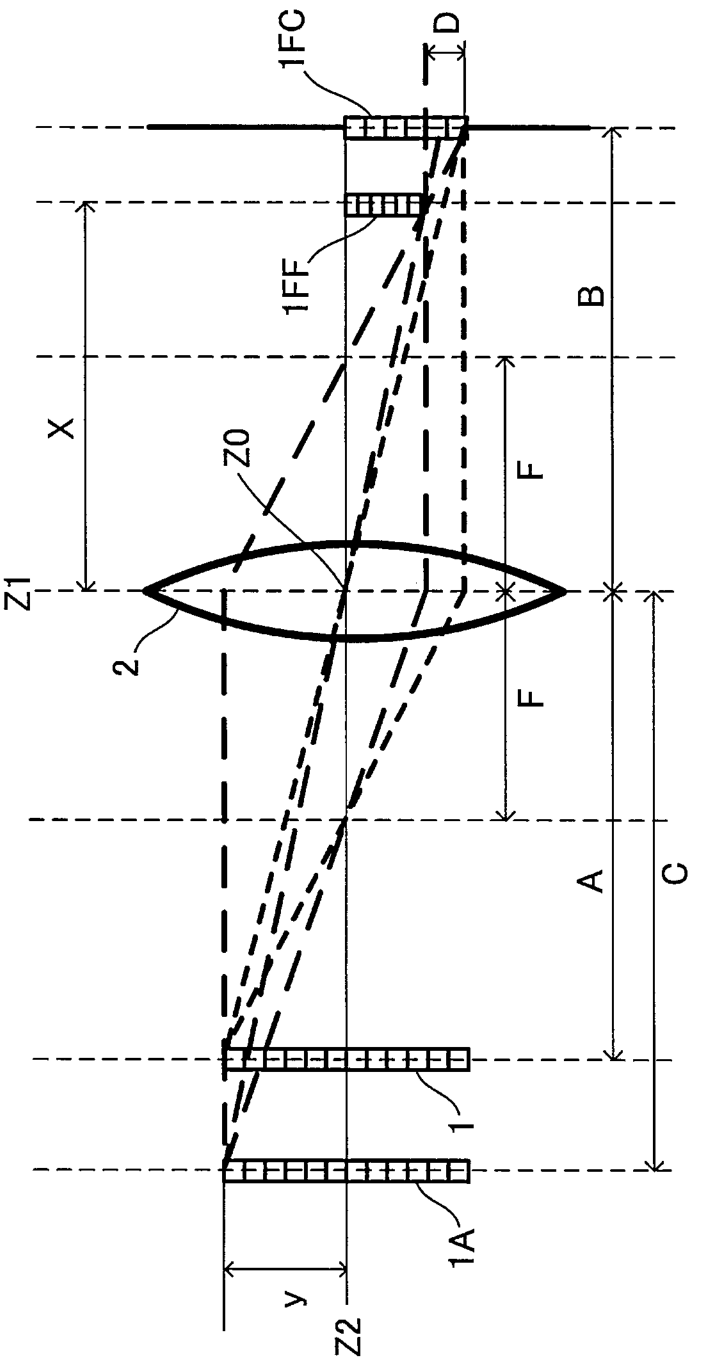
FIG. 2 is a diagram illustrating an example of a relationship among a plurality of light sources, a lens, and a projection plane.

FIG. 2 is a diagram illustrating an example of a relationship among the plurality of light sources 1, the lens 2, and a projection plane.

The lens 2 is located in front of the plurality of light sources 1. That is, the lens 2 is located to face the plurality of light sources 1. In the example illustrated in FIG. 1, the lens 2 is a convex lens. The focal length of the lens 2 is F.

A center axis Z1 is perpendicular to an optical axis Z2 of the lens 2. A distance A is a distance from the center axis Z1 of the lens 2 to each light source 1, and is a distance on a straight line parallel to the optical axis Z2. In this case, the relationship between the focal length F and the distance A is F<A. A light emission pattern of the plurality of light sources 1 is projected onto the projection plane. Each of the light sources 1 is connected to the leaf-filtered sunlight source control module 3, and controlled by the leaf-filtered sunlight source control module 3.

In this application, a distance from a center Z0 of the lens 2 refers to a distance from the center Z0 of the lens 2 and a distance on a straight line parallel to the optical axis Z2, and a distance from the center axis Z1 of the lens 2 refers to a distance from the center axis Z1 of the lens 2 and a distance on a straight line parallel to the optical axis Z2.

In the example illustrated in FIG. 2, the plurality of light sources 1 are arranged in parallel with the center axis Z1. A projected image 1FF in focus is projected at a distance B from the center axis Z1 of the lens 2. In the example illustrated in FIG. 2, the number of light sources 1 is 12. FIG. 2 shows the projected image 1FF corresponding to the upper half of the 12 light sources 1.

In the example illustrated in FIG. 2, a relationship of (1/A)+(1/B)=(1/F) is established. Thus, if the relationship between the focal length F and the distance A satisfies F<A, B is a positive value, and a light emission pattern of the plurality of light sources 1 is projected on the projection plane.

Suppose the light emission pattern of the light sources 1 is projected with a magnification α=(b/a), the focal length F is expressed as F={α/(α+1)}×A. Thus, each component of the leaf-filtered sunlight simulation control device 100 is included in a positional relationship satisfying F<A.

If a condition between the focal length F and the distance A is F<A, light emission patterns of the plurality of light sources 1 are projected onto the projection plane, but the upper limit should also be considered. Sunlight arriving from almost infinity is parallel beams, and leaf-filtered sunlight theoretically forms a sharp and focused projection image in any projection state. However, in practice, a blurred projected image is formed by diffraction of light, and thus, even if the magnification α and the focal length F are determined so that the focal length F is F={α/(α+1)}×A, the distance A does not need to be determined.

In view of this, as illustrated in FIG. 2, the positions of the plurality of light sources 1 are set at a distance C from the center axis Z1 of the lens 2. In FIG. 2, the plurality of light sources 1 arranged at the distance C from the center axis Z1 of the lens 2 are indicated as the "plurality of light sources 1A." In this case, the plurality of light sources 1A are also arranged in parallel with the center axis Z1 of the lens 2. The distance C is longer than the distance A. In this case, as indicated by broken lines in FIG. 2, light beams from the plurality of light sources 1A are collected at a position at a distance X from the center axis Z1 of the lens 2, and a projected image 1FF in focus is formed at the distance X from the center axis Z1 of the lens 2, and a blurred projected image 1FC including a difference D from the projected image 1FF is formed at the distance B from the center axis Z1 of the lens 2.

Figure 3:
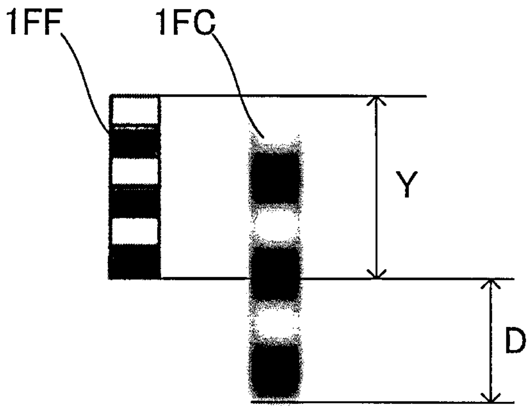
FIG. 3 is a diagram schematically illustrating a light emission pattern formed at a distance X from the center axis of the lens and a light emission pattern formed at a distance B from the center of the lens.

FIG. 3 is a diagram schematically illustrating the projected image 1FF formed at the distance X from the center axis Z1 of the lens 2 and the projected image 1FC formed at the distance B from the center Z1 of the lens 2.

In a case where light sources in an upper half of the plurality of light sources 1A illustrated in FIG. 2 are on, off, on, off, on, and off in this order from the top, as a light emission pattern of each light source 1A, the projected image 1FF is formed at the distance X from the center axis Z1 of the lens 2 and the blurred projected image 1FC is formed on the projection plane at the distance B from the center axis Z1 of the lens 2, as illustrated in FIG. 3.

Assuming that the projected image 1FF is smoothed and becomes uniform, it is considered that when a length Y of the projected image 1FF becomes a length of the blurred projected image 1FC, Y+D=2Y, the image is averaged. Thus, the distance C needs to be limited so that the difference D is smaller than the length Y.

In a case where the plurality of light sources 1A are located at the distance C from the center axis Z1 of the lens 2, suppose the length of an upper half or a lower half of the plurality of light sources 1A is y and the length of the projected image 1FF formed at the distance X from the center axis Z1 of the lens 2 is Y, the following relationship is established:

$$X/C=Y/y$$

In a case where the plurality of light sources 1A are located at the distance C from the center axis Z1 of the lens 2, suppose the length of the upper or the lower half of the plurality of light sources 1A is y and the length of the projected image 1FC on the projection plane at the distance B from the center axis Z1 of the lens 2 is "Y+D," the following relationship is established:

$$B/C=(Y+D)/y$$

To reduce averaging due to blurring, the relationship between the difference D and the length Y is set at D<Y. That is, the difference D is set smaller than the length Y. In this case, the following relationship is established:

$$B/C<(Y+Y)/y=2Y/y=2X/C$$

Thus, the plurality of light sources 1A need to be placed at the distance C from the center axis Z1 of the lens 2 to satisfy B<2X. The distance A from the center axis Z1 of the lens 2 having the focal length F to each light source 1 and the distance B from the center axis Z1 of the lens 2 to the projection plane have the following relationship:

$$(1/A)+(1/B)=(1/F)$$

$$B=(A\times F)/(A-F)<2X$$

The distance C from the center axis Z1 of the lens 2 having the focal length F to each light source 1A and the distance X from the center axis Z1 of the lens 2 to a focal point have the following relationship:

$$(1/C)+(1/X)=(1/F)$$

$$X=(C\times F)/(C-F)$$

If B<2X, the difference D that is the degree of blurring is smaller than the length Y. Thus, if the following relationship is satisfied, averaging due to blurring can be reduced.

$$B=(A\times F)/(A-F)<2X$$

$$=(2\times C\times F)/(C-F)$$

As described above, the positions of the plurality of light sources 1 and the position of the lens 2 with the focal length F are positions at which the relationship between the focal length F and the distance A from the center axis Z1 of the lens 2 to each of the light sources 1 satisfies F<A. That is, the leaf-filtered sunlight light source control module 3 controls the positions of the plurality of light sources 1 so that F<A is satisfied. In this case, when the plurality of light sources 1 are arranged to satisfy A C and (A×F)/(A−F)<(2×C×F)/(C−F), the distance B from the center axis Z1 of the lens 2 to the projection plane is a positive value, and a projected image with a reduced difference D, which is the degree of blurring, can be obtained. In this manner, sunshine filtering through the leaves visually recognized by a person can be simulated.

As described above, this embodiment can provide a leaf-filtered sunlight simulation control device capable of simulating sunshine filtering through the leaves with a simple configuration. In addition, in this embodiment, light simulating sunshine filtering through the leaves can be projected over a larger area than the light source unit.

The leaf-filtered sunlight source control module 3 is constituted by, for example, at least one processor and at least one memory. The processor is, for example, a central processing unit (CPU) that executes a program stored in the memory. In this case, the function of each constitutional element of the leaf-filtered sunlight source control module 3 is achieved by software, firmware, or a combination of software and firmware. The software and the firmware can be stored in the memory as a program. With this configuration, the program for achieving functions of the leaf-filtered sunlight source control module 3 is executed by a computer.

The memory is a computer-readable recording medium, and is, for example, a volatile memory such as a random access memory (RAM) and a read only memory (ROM), a nonvolatile memory, or a combination of a volatile memory and a nonvolatile memory.

The leaf-filtered sunlight source control module 3 may be constituted by processing circuitry as dedicated hardware such as a single circuit or a composite circuit. In this case, the function of each component of the leaf-filtered sunlight source control module 3 is performed by the processing circuitry.

Second Embodiment

Figure 4:
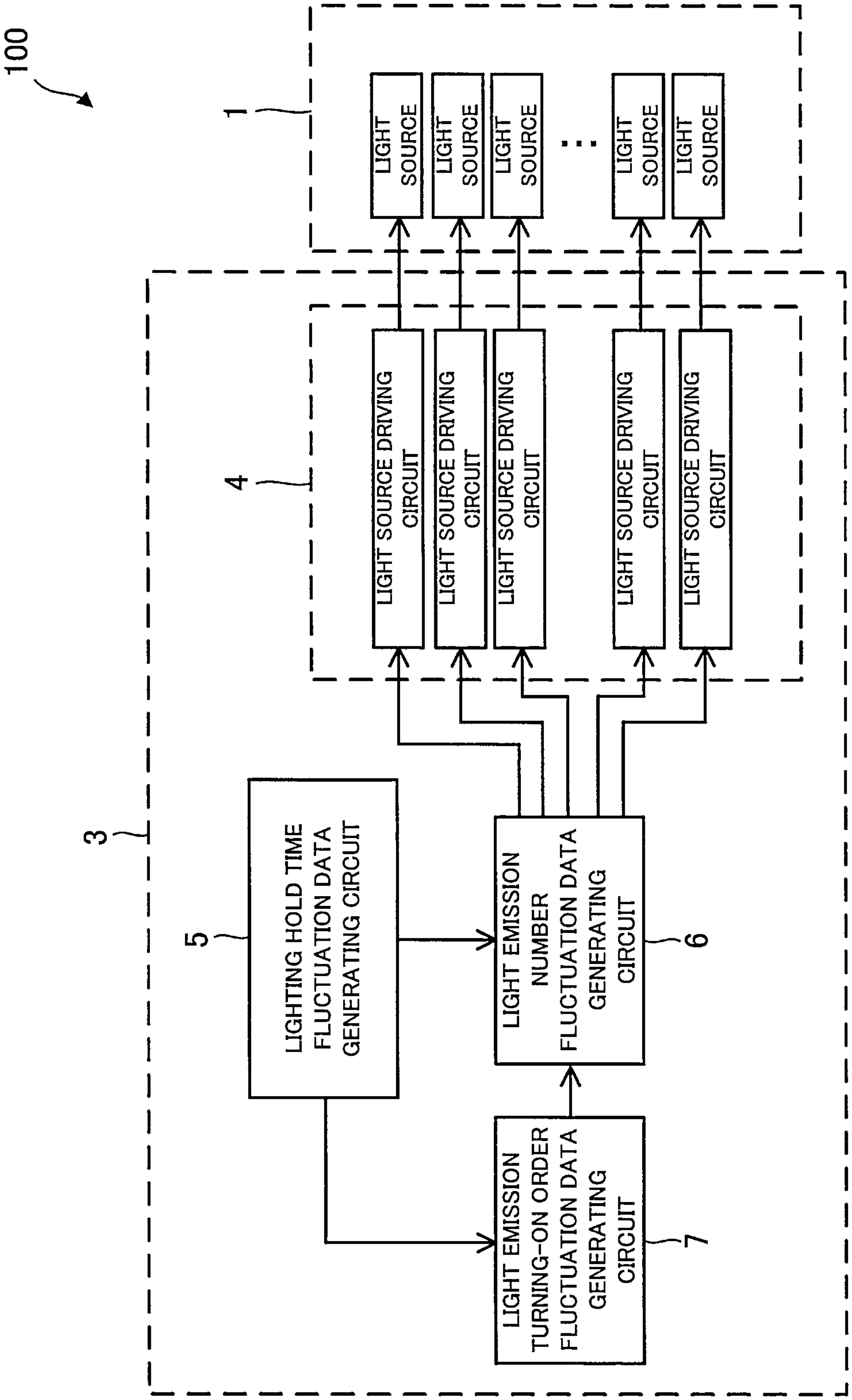
FIG. 4 is a block diagram schematically showing a configuration of a leaf-filtered sunlight simulation control device according to a second embodiment of the present disclosure.

FIG. 4 is a block diagram schematically showing a configuration of a leaf-filtered sunlight simulation control device 100 according to a second embodiment of the present disclosure. In FIG. 4, the lens 2 is omitted.

In the second embodiment, a leaf-filtered sunlight light source control module 3 of the leaf-filtered sunlight simulation control device 100 includes a light source driving circuit 4, a lighting hold time fluctuation data generating circuit 5, a light emission number fluctuation data generating circuit 6, and a light emission turning-on order fluctuation data generating circuit 7. The light source driving circuit 4 is constituted by, for example, a plurality of light sources driving circuits.

The leaf-filtered sunlight light source control module 3 includes light emission turning-on order fluctuation data for determining a turning-on order or a turning-off order of the plurality of light sources 1, light emission fluctuation data for determining light sources 1 to be turned on among the plurality of light sources 1, and fluctuation data for determining how long the plurality of light sources 1 are turned on or off.

The leaf-filtered sunlight light source control module 3 controls the turning-on order or the turning-off order of the plurality of light sources 1 by using the light emission turning-on order fluctuation data, controls the light sources 1 to be turned on by using the light emission fluctuation data, and controls how long the plurality of light sources 1 are turned on or off by using the fluctuation data.

The lighting hold time fluctuation data generating circuit 5 generates and outputs fluctuation data. The light emission number fluctuation data generating circuit 6 generates and outputs light emission fluctuation data. The light emission turning-on order fluctuation data generating circuit 7 generates and outputs light emission turning-on order fluctuation data.

An output from the light emission turning-on order fluctuation data generating circuit 7 is input to the light emission number fluctuation data generating circuit 6. An instruction for turning on or off the plurality of light sources 1 is output from the light emission number fluctuation data generating circuit 6 and input to the light source driving circuit 4. The light source driving circuit 4 is a circuit for driving each of the light sources 1 to turn the light source 1 on or off. The holding time in which each of the light sources 1 is turned on or off is determined by the lighting hold time fluctuation data generating circuit 5, and outputs from the light emission turning-on order fluctuation data generating circuit 7 and the light emission number fluctuation data generating circuit 6 are updated.

Figure 5:
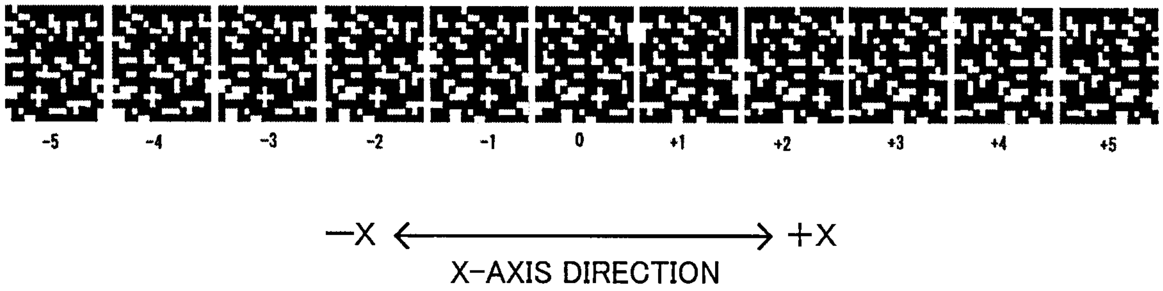
FIG. 5 is a diagram showing an example of changes in light emission turning-on order or changes in movement of turning-on in a plurality of light sources.

FIG. 5 is a diagram showing an example of changes in light emission turning-on order or changes in movement of turning-on in the plurality of light sources 1.

In the example shown in FIG. 5, 16×16 matrix light sources are turned on or off, and a digital mosaic pattern shows a state where lighting portions simulate light diffused as leaf-filtered sunlight.

In the example shown in FIG. 5, a state where objects shielding sunlight (e.g., branches or leaves of trees) sway in the X-axis direction is simulated, and light sources in the on states serve as light emission points reaching the ground as sunshine filtering through the leaves. While the objects shielding sunlight sway in the X-axis direction, with respect to “0” as the center in FIG. 5, a light emission point moves in the +X direction (rightward in FIG. 5) in an area with a positive direction, whereas the light emission point moves in the −X direction (leftward in FIG. 5) in an area with a negative direction.

The light emission turning-on order fluctuation data generating circuit 7 generates and outputs light emission turning-on order fluctuation data for determining to which light source 1 is turned on in the positive direction (e.g., up to +3) and in the negative direction (e.g., up to −3) with respect to “0” as the center in FIG. 5 and turning on the light source 1. In this case, it is preferable to generate and output light emission turning-on order fluctuation data for controlling light emission points regarding not only sway in the X-axis direction but also sway in a direction perpendicular to the X-axis direction, thereby expressing sway in the two orthogonal directions by turning on the light sources 1.

Figure 6:
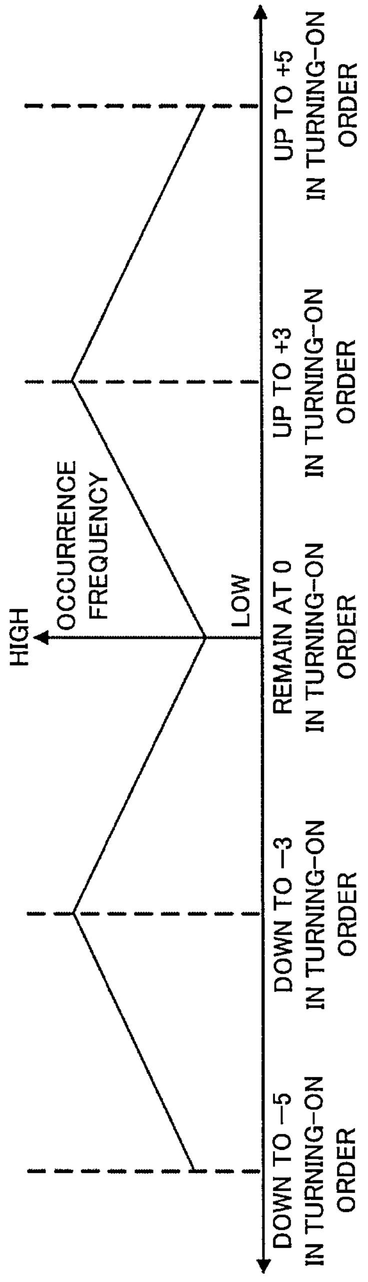
FIG. 6 is a diagram showing an example of occurrence frequency of turning-on of the plurality of light sources arranged in an X-axis direction.

FIG. 6 is a diagram showing an example of occurrence frequency of turning-on of the plurality of light sources 1 arranged in the X-axis direction.

The light emission turning-on order fluctuation data generating circuit 7 determines fluctuation as shown in FIG. 6, for example. Suppose the light source at the center of the plurality of light sources 1 arranged in the X-axis direction is "0," the light emission turning-on order fluctuation data generating circuit 7 generates and outputs light emission turning-on order fluctuation data for controlling the light sources 1 so that light sources up to +3 are frequently turned on the positive side in the turning-on order and light sources down to −3 are frequently turned off on the negative side.

On the other hand, the light emission turning-on order fluctuation data generating circuit 7 generates and outputs light emission turning-on order fluctuation data for controlling the light sources 1 so that the light sources 1 of +3 to +5 are less frequently turned on, generates and outputs light emission turning-on order fluctuation data for controlling the light sources 1 so that the light sources 1 of −3 to −5 are less frequently turned on, and generates and outputs light emission turning-on order fluctuation data for controlling the light sources 1 so that the light source is less frequently turned on at "0."

Through such control, the leaf-filtered sunlight simulation control device 100 achieves fluctuation control in which objects shielding sunlight frequently sway with stability and occurrence frequency of an unstable sway state is low. In other words, in a case where control is performed so that occurrence frequency maintaining the state where the turning-on order is at the "0" position is highest, light sources up to +5 on the positive side of the turning-on order are less frequently turned on, and light sources down to −5 on the negative side are less frequently turned on, a state where objects shielding sunlight do not sway and sometimes sway can be simulated.

Figure 7:
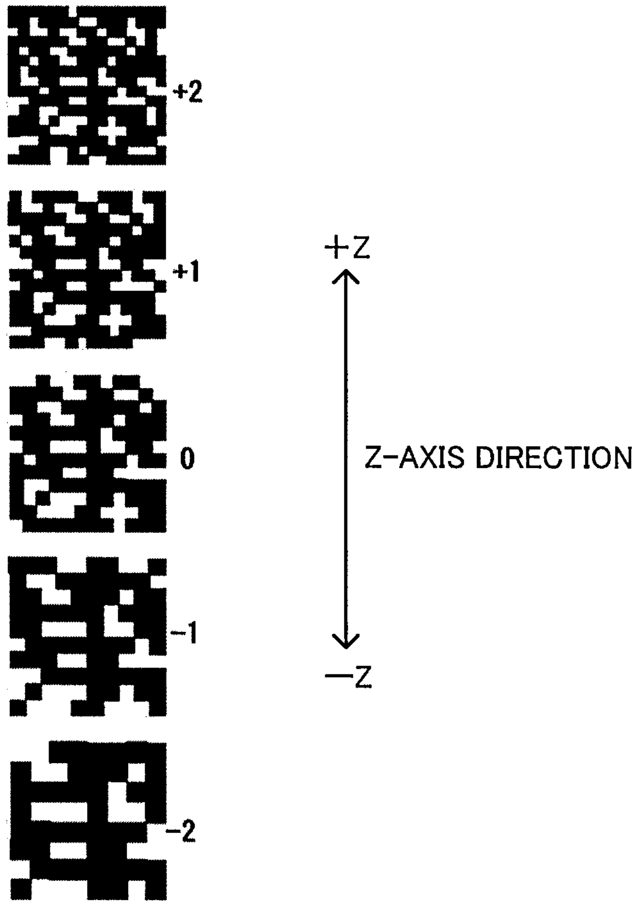
FIG. 7 is a diagram showing an example of changes in the number of light emissions or changes in light emission width in the plurality of light sources.

FIG. 7 is a diagram showing an example of changes in the number of light emissions or changes in light emission width in the plurality of light sources 1.

In the example shown in FIG. 7, 16×16 matrix light sources are turned on or off, and a situation where lighting portions simulate light diffused as leaf-filtered sunlight is simulated. Specifically, FIG. 7 is a diagram simulating a state where objects shielding sunlight (e.g., branches or leaves of trees) sway in the Z-axis direction, and light sources 1 in the on states serve as light emission points reaching the ground as sunshine filtering through the leaves. The Z-axis direction is a direction perpendicular to the X-axis direction.

While objects shielding sunlight sway in the Z-axis direction, with respect to the light source 1 at the position of "0" shown in FIG. 7 serving as the center, the light emission point width (i.e., light emission area) decreases as the objects shielding sunlight move away from the sun (light sources 1 in the leaf-filtered sunlight simulation control device 100), whereas the light emission point width (i.e., light emission area) increases as the objects shielding sunlight move toward the sun (light sources in the leaf-filtered sunlight simulation control device 100).

The light emission number fluctuation data generating circuit 6 generates and outputs light emission fluctuation data for controlling the number of light emissions (i.e., light emission width of the plurality of light sources 1) to simulate a state where objects shielding sunlight (e.g., branches or leaves of trees) sway in the Z-axis direction. For example, the light emission number fluctuation data generating circuit 6 generates and outputs light emission fluctuation data for controlling turning on and off of the light sources 1, such as enlargement and reduction of an image.

Figure 8:
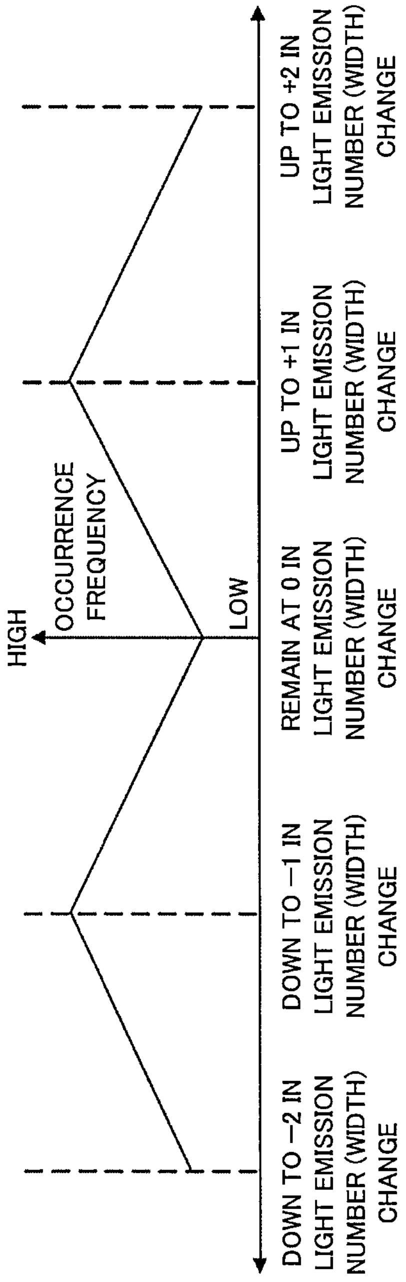
FIG. 8 is a diagram showing an example of occurrence frequency of the number of light emissions of the plurality of light sources (i.e., light emission width of the plurality of light sources) arranged in a Z-axis direction.

FIG. 8 is a diagram showing an example of occurrence frequency of the number of light emissions of the plurality of light sources 1 (i.e., light emission width of the plurality of light sources 1) arranged in the Z-axis direction.

The light emission number fluctuation data generating circuit 6 determines fluctuation as shown in FIG. 8, for example. Suppose the light source at the center of the plurality of light sources 1 arranged in the Z-axis direction is "0," the light emission number fluctuation data generating circuit 6 generates and outputs light emission fluctuation data for controlling the light sources 1 so that the number of light emissions up to +1 on the positive side of the number of light emissions frequently changes, whereas the number of light emissions down to −1 on the negative side frequently changes.

On the other hand, the light emission number fluctuation data generating circuit 6 generates and outputs light emission fluctuation data for controlling the light sources 1 so that the number of light emissions less frequently changes from +1 to +2, generates and outputs light emission fluctuation data for controlling the light sources 1 so that the number of light emissions less frequently changes from −1 to −2, generates and outputs light emission fluctuation data for controlling the light sources 1 so that the number of light emissions less frequently changes at the position of "0."

Through such control, the leaf-filtered sunlight simulation control device 100 achieves fluctuation control in which objects shielding sunlight frequently sway with stability and occurrence frequency of an unstable sway state is low. In other words, in a case where control is performed so that occurrence frequency maintaining the state where the number of light emissions is the "0" position is highest, the number of light emissions less frequently changes up to +2 on the positive side, and the number of light emissions down to −2 on the negative side less frequently changes, a state where the objects shielding sunlight do not sway and sometimes sway is simulated.

The lighting hold time fluctuation data generating circuit 5 outputs fluctuation data for controlling the holding time of each light emission state in which the lighting state changes from a positive-side change to a negative-side change, to the light emission turning-on order fluctuation data generating circuit 7 and the light emission number fluctuation data generating circuit 6. For example, in a case where the light emission turning-on order fluctuation data generating circuit 7 determines change control from +2 to −2 shown in FIG. 5, the lighting hold time fluctuation data generating circuit 5 outputs fluctuation data for controlling the holding times of the light emission state of +2, +1, 0, −1, and −2, to the light emission turning-on order fluctuation data generating circuit 7 and the light emission number fluctuation data generating circuit 6. With this control of the holding times of the light-emitting states, it is possible to simulate the period of swaying of objects shielding sunlight (e.g. branches or leaves of trees).

Figure 9:
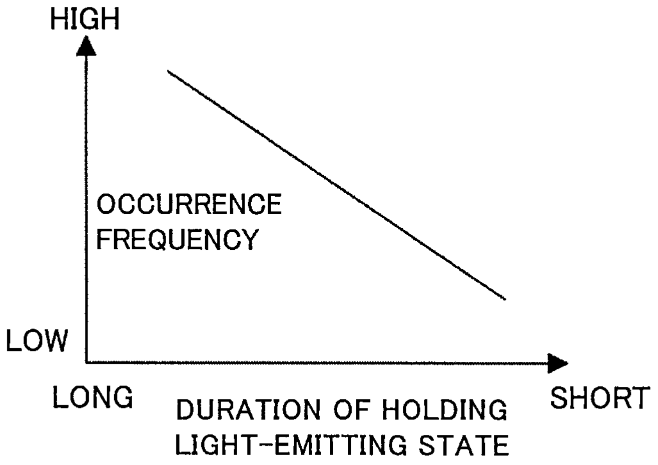
FIG. 9 is a graph schematically showing a relationship between the duration of holding a light-emitting state and occurrence frequency.

FIG. 9 is a graph schematically showing a relationship between the duration of holding a light-emitting state and occurrence frequency.

The lighting hold time fluctuation data generating circuit 5 determines an occurrence frequency and generates fluctuation data, as shown in FIG. 9, for example. With control performed so that a state where the duration of holding the light-emitting state is long frequently occurs and a state where the duration of holding the light-emitting state is short less frequently occurs, it is possible to simulate a situation in which a state where a period of sway of the objects shielding sunlight (e.g., branches or leaves of trees) is long (i.e., a state where the objects move slowly) is a steady state and a state where a period of sway of the objects shielding sunlight is short (i.e., a state where the objects move vigorously) occurs occasionally (e.g., the state of sudden gust of wind).

As described above, in this embodiment, the direction, range, and periods of change in movement of a projected image of sunshine filtering through the leaves visually recognized by a person can be simulated. For example, simulation of sunshine filtering through the leaves is performed on a case where when objects shielding the light sources 1 move laterally by wind or other factors, the distance between the object shielding the light sources and the light sources 1 changes by wind or other factors. In this manner, sunshine filtering through the leaves generated by lateral movement of twigs or vertical movement of branches can be simulated.

Third Embodiment

Figure 10:
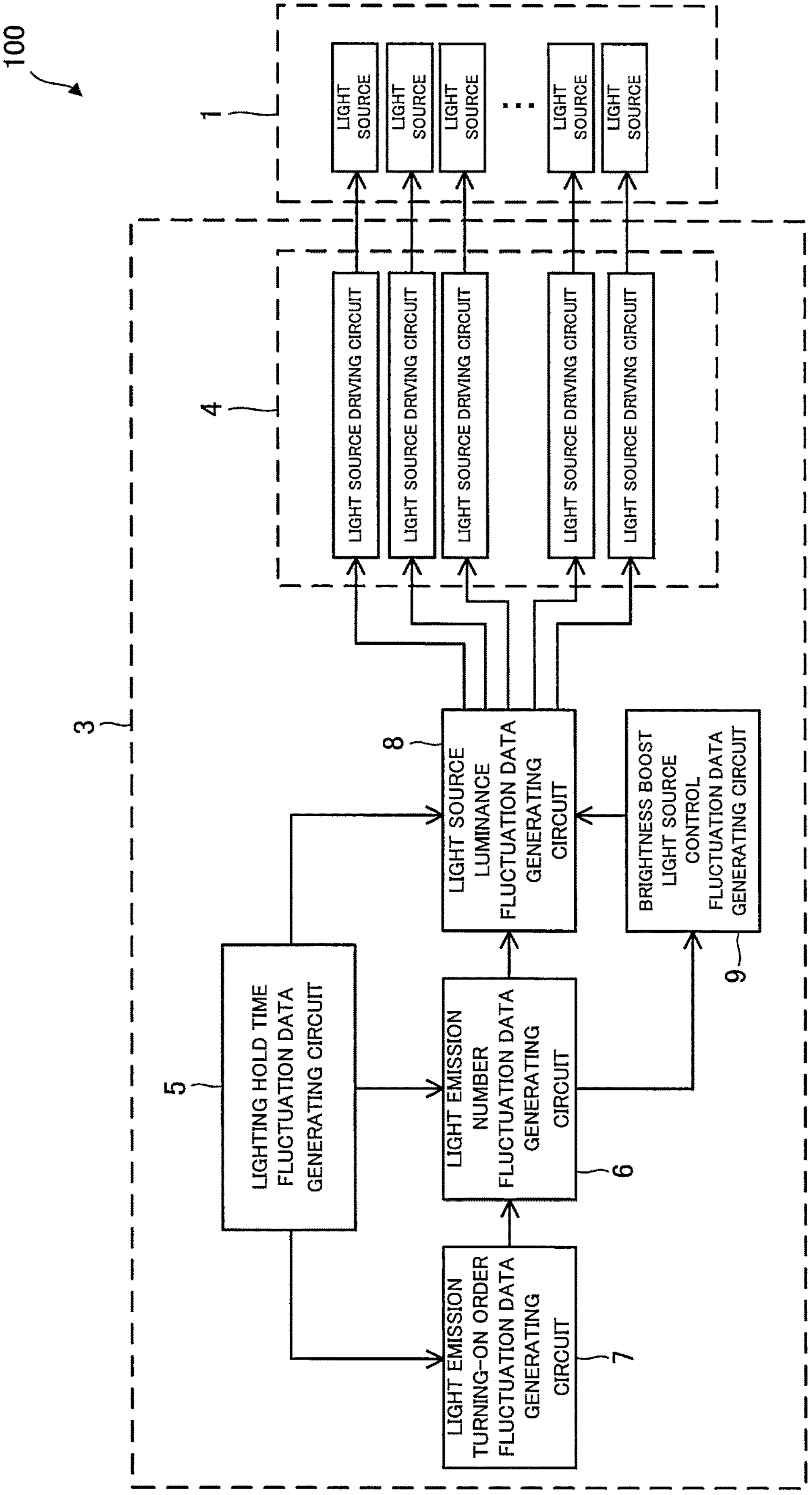
FIG. 10 is a block diagram schematically illustrating a configuration of a leaf-filtered sunlight simulation control device according to a third embodiment of the present disclosure.

FIG. 10 is a block diagram schematically illustrating a configuration of a leaf-filtered sunlight simulation control device 100 according to a third embodiment of the present disclosure.

In the third embodiment, a leaf-filtered sunlight light source control module 3 of the leaf-filtered sunlight simulation control device 100 includes at least one light source driving circuit 4, a lighting hold time fluctuation data generating circuit 5, a light emission number fluctuation data generating circuit 6, a light emission turning-on order fluctuation data generating circuit 7, a light source luminance fluctuation data generating circuit 8, and a brightness boost light source control fluctuation data generating circuit 9. The light source driving circuit 4 is constituted by, for example, a plurality of light sources driving circuits.

An output from the light emission turning-on order fluctuation data generating circuit 7 is input to the light emission number fluctuation data generating circuit 6. The light emission number fluctuation data generating circuit 6 outputs an instruction for controlling turning on and off of the plurality of light sources 1, and this output is input to the light source luminance fluctuation data generating circuit 8 and the brightness boost light source control fluctuation data generating circuit 9. An output from the brightness boost light source control fluctuation data generating circuit 9 is input to the light source luminance fluctuation data generating circuit 8. An output from the light source luminance fluctuation data generating circuit 8 is input to the light source driving circuit 4. The light source driving circuit 4 is driven to turn on or off the plurality of light sources 1.

The lighting hold time fluctuation data generating circuit 5 determines and outputs a holding time of a state where the plurality of light sources 1 are on or off. An output from the lighting hold time fluctuation data generating circuit 5 is input to the light emission turning-on order fluctuation data generating circuit 7, the light emission number fluctuation data generating circuit 6, and the light source luminance fluctuation data generating circuit 8. In this manner, outputs from the light emission turning-on order fluctuation data generating circuit 7, the light emission number fluctuation data generating circuit 6, and the light source luminance fluctuation data generating circuit 8 are updated.

The leaf-filtered sunlight simulation control device 100 according to the second embodiment as a device simulating leaf-filtered sunlight can simulate sway of objects shielding sunlight (e.g., branches or leaves of trees), whereas the leaf-filtered sunlight simulation control device 100 according to the third embodiment can simulate a change in luminance of light that comes through objects shielding sunlight.

An area of diffusion of light generated by objects shielding sunlight actually subtly changes every moment, and the amount of coming light beams varies with the area. In addition to the area of the coming light, brightness changes because sunlight itself is shaded by clouds, for example. Even in a case where the plurality of light sources 1 have the same size, when the plurality of light sources 1 are controlled to fluctuate luminance in illumination so that changes in luminance of leaf-filtered sunlight can be simulated. For example, the leaf-filtered sunlight light source control module 3 changes luminance of each of the plurality of light sources 1 at a predetermined timing (also referred to as a "first timing"). Accordingly, the leaf-filtered sunlight simulation control device 100 can simulate changes of luminance of light that comes through objects shielding sunlight.

Instructions generated by the light emission turning-on order fluctuation data generating circuit 7 and the light emission number fluctuation data generating circuit 6 are input to the light source luminance fluctuation data generating circuit 8. The light source luminance fluctuation data generating circuit 8 determines a luminance of each of the light sources 1 during illumination, and an output indicating the determined luminance is input to the light source driving circuit 4.

Figure 11:
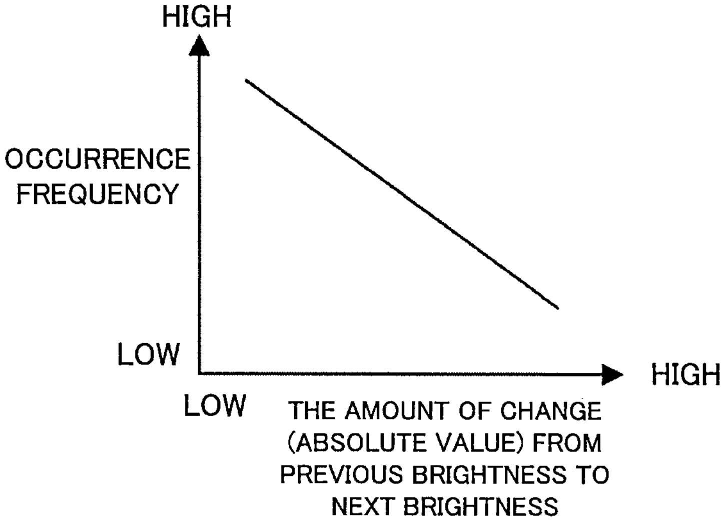
FIG. 11 is a graph schematically showing a relationship between the amount of change from previous brightness to next brightness and occurrence frequency.

FIG. 11 is a graph schematically showing a relationship between the amount of change from previous brightness to next brightness and occurrence frequency.

Data occurrence frequency set by the light source luminance fluctuation data generating circuit 8 is shown by, for example, FIG. 11. Regarding light source luminance fluctuation data in which brightness is updated at the timing of output of the lighting hold time fluctuation data generating circuit 5, as the absolute value of the amount of change from previous brightness before update to next brightness after update decreases, higher occurrence frequency is set, whereas as the absolute value of the amount of change increases, lower occurrence frequency is set. With this setting, it is possible to simulate a situation in nature in which no significant changes occur usually, and while minor changes continue, changes occur occasionally.

The brightness boost light source control fluctuation data generating circuit 9 simulates the state of becoming suddenly more bright than usual. For example, the brightness boost light source control fluctuation data generating circuit 9 simulates the state of being more bright than usual in a case where an object shielding sunlight includes a reflector. In this case, the light sources 1 that are specified to turn on by the light emission turning-on order fluctuation data generating circuit 7 and the light emission number fluctuation data generating circuit 6 are caused to emit light strongly at a timing (also referred to as a "second timing") different from a data update timing (e.g., first timing) of the lighting hold time fluctuation data generating circuit 5.

For example, in the case of simulating the state of being more bright than usual with the leaf-filtered sunlight simulation control device 100, the leaf-filtered sunlight light source control module 3 increases a luminance of one of the plurality of light sources 1 at the predetermined second timing to a luminance higher than the highest luminance at the first timing. In this manner, the leaf-filtered sunlight simulation control device 100 simulates the state of being more bright than usual.

Fourth Embodiment

Figure 12:
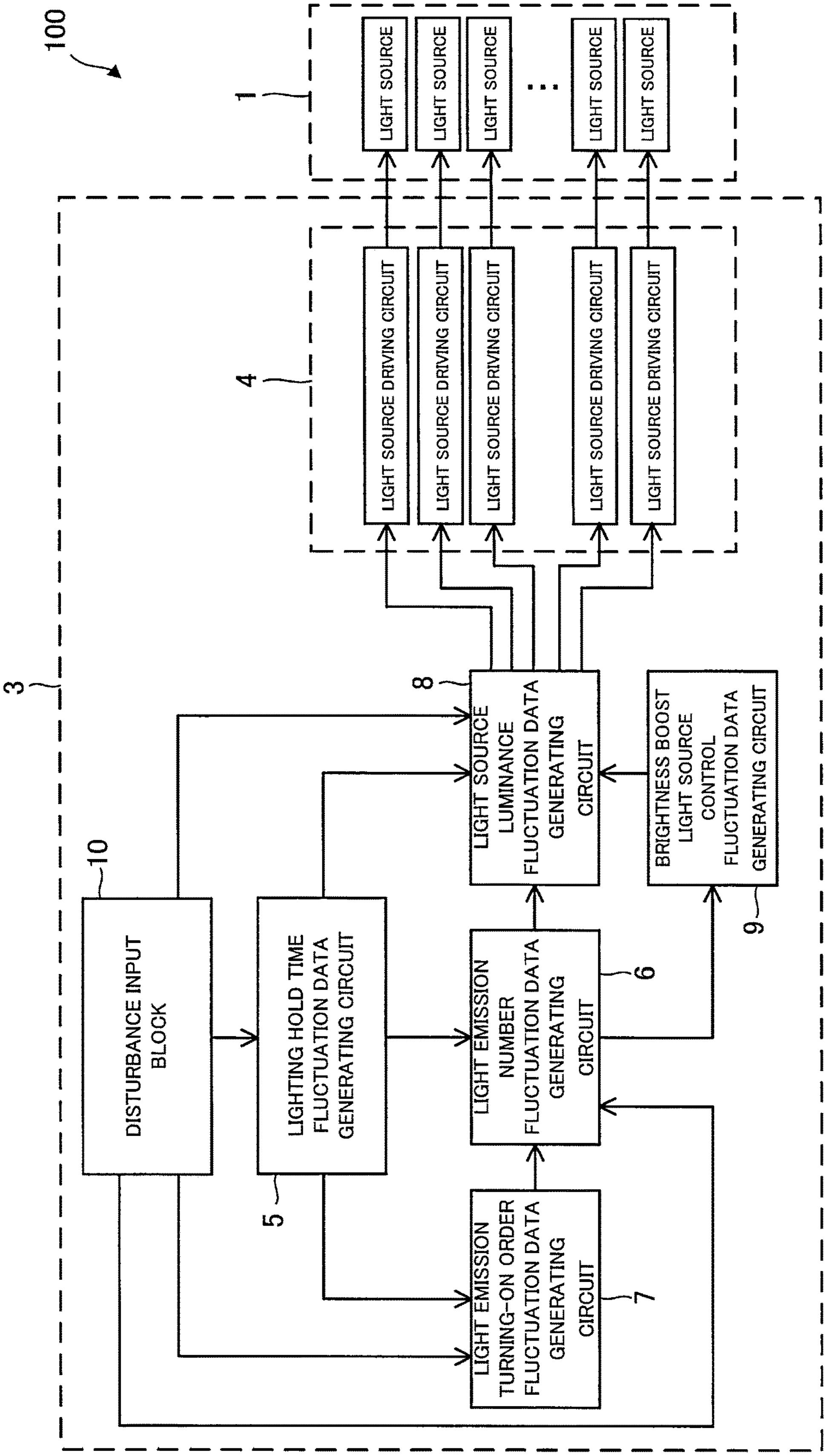
FIG. 12 is a block diagram schematically illustrating a configuration of a leaf-filtered sunlight simulation control device according to a fourth embodiment of the present disclosure.

FIG. 12 is a block diagram schematically illustrating a configuration of a leaf-filtered sunlight simulation control device 100 according to a fourth embodiment of the present disclosure.

In the fourth embodiment, a leaf-filtered sunlight light source control module 3 of the leaf-filtered sunlight simulation control device 100 includes a light source driving circuit 4, a lighting hold time fluctuation data generating circuit 5, a light emission number fluctuation data generating circuit 6, a light emission turning-on order fluctuation data generating circuit 7, a light source luminance fluctuation data generating circuit 8, a brightness boost light source control fluctuation data generating circuit 9, and an disturbance input block 10. The light source driving circuit 4 is constituted by, for example, a plurality of light sources driving circuits.

The leaf-filtered sunlight simulation control device 100 according to the fourth embodiment is different from the leaf-filtered sunlight simulation control device 100 according to the third embodiment in that the leaf-filtered sunlight light source control module 3 includes the disturbance input block 10.

The disturbance input block 10 is, for example, a pressure sensor that measures pressures in the positive direction and the negative direction in each of the three axes of XYZ. In this case, the pressure sensor measures a wind pressure in each direction and outputs measurement data.

The disturbance input block 10 may be a wind velocity sensor that measures a wind velocity in the positive direction and the negative direction in each of the three axes of XYZ. In this case, the wind velocity sensor measures a wind velocity in each direction and outputs measurement data.

An output from the light emission turning-on order fluctuation data generating circuit 7 is input to the light emission number fluctuation data generating circuit 6. An instruction for controlling turning on and off of the plurality of light sources 1 is output from the light emission number fluctuation data generating circuit 6, and input to the light source luminance fluctuation data generating circuit 8 and the brightness boost light source control fluctuation data generating circuit 9.

An output from the brightness boost light source control fluctuation data generating circuit 9 is input to the light source luminance fluctuation data generating circuit 8, and an output from the light source luminance fluctuation data generating circuit 8 is input to the light source driving circuit 4. The light source driving circuit 4 is driven to turn on or off the plurality of light sources 1.

The lighting hold time fluctuation data generating circuit 5 determines and outputs the holding time of the state where the plurality of light sources 1 are turned on or off. An output from the lighting hold time fluctuation data generating circuit 5 is input to the light emission turning-on order fluctuation data generating circuit 7, the light emission number fluctuation data generating circuit 6, and the light source luminance fluctuation data generating circuit 8. In this manner, outputs from the light emission turning-on order fluctuation data generating circuit 7, the light emission number fluctuation data generating circuit 6, and the light source luminance fluctuation data generating circuit 8 are updated.

The leaf-filtered sunlight light source control module 3 corrects light emission turning-on order fluctuation data, light emission fluctuation data, and fluctuation data by using measurement data measured by the disturbance input block 10. Specifically, an output from the disturbance input block 10 is input to the light emission turning-on order fluctuation data generating circuit 7, the light emission number fluctuation data generating circuit 6, the lighting hold time fluctuation data generating circuit 5, and the light source luminance fluctuation data generating circuit 8, and is used for correcting data generated in these circuits.

Outputs of measurement data corresponding to the X- and Y-axis directions and detected by the disturbance input block 10 are input to the light emission turning-on order fluctuation data generating circuit 7, and an output of measurement data corresponding to the Z-axis direction is input to the light emission number fluctuation data generating circuit 6.

The leaf-filtered sunlight light source control module 3 corrects a luminance of each of the plurality of light sources 1 changing at the first timing by using the measurement data measured by the disturbance input block 10. In this case, for example, the disturbance input block 10 outputs an average value or a maximum absolute value data of absolute value measurement data in the X-, Y-, and Z-directions to the lighting hold time fluctuation data generating circuit 5 and the light source luminance fluctuation data generating circuit 8.

Figure 13:
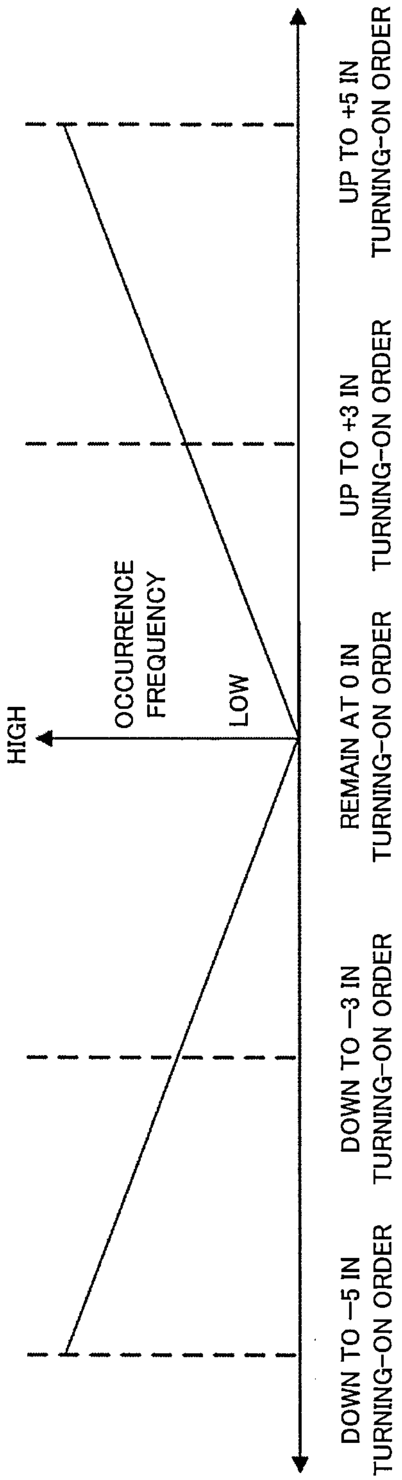
FIG. 13 is a diagram showing an example of occurrence frequency of turning on the plurality of light sources.

FIG. 13 is a diagram showing an example of occurrence frequency of turning-on of the plurality of light sources 1.

As wind velocity disturbance or wind pressure disturbance increases in the X-axis direction and the Y-axis direction, the light emission turning-on order fluctuation data generating circuit 7 determines fluctuation and operates as shown in FIG. 13, from data output occurrence frequency shown in FIG. 6, for example.

Since disturbance inputs increase in the X-axis direction and the Y-axis direction, the leaf-filtered sunlight light source control module 3 performs control fluctuating so that light sources up to +5 on the positive side in the turning-on order with respect to the position of "0" shown in FIG. 5 as the center are frequently turned on, light sources down to −5 on the negative side are frequently turned on, and the state of being turned on does not occur at the position of "0." In this manner, the leaf-filtered sunlight simulation control device 100 simulates fluctuation with which objects shielding sunlight frequently greatly sway and frequency of occurrence of fixed states is low.

Figure 14:
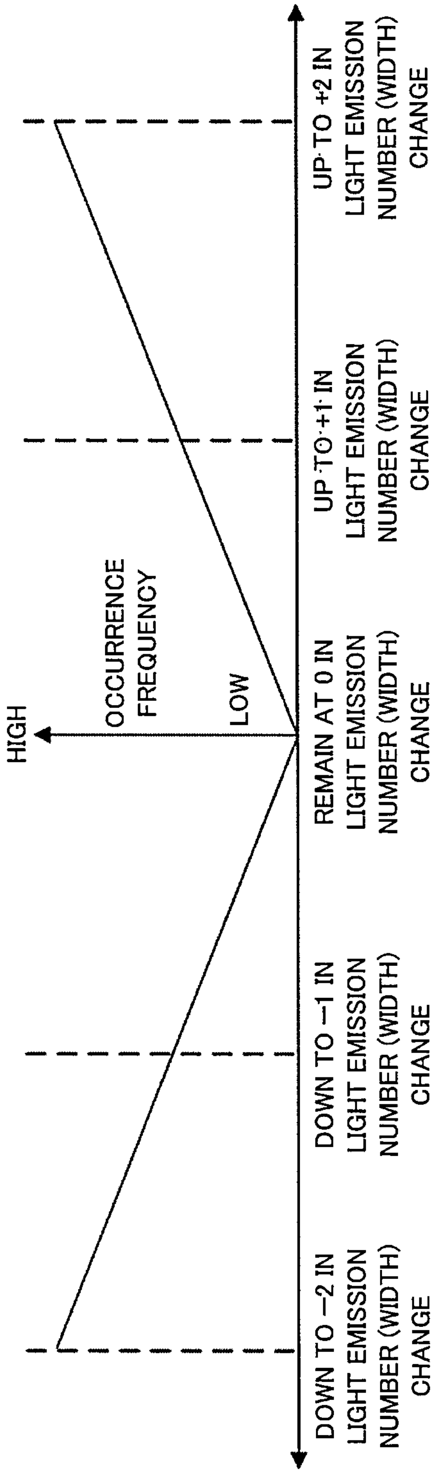
FIG. 14 is a diagram showing an example of occurrence frequency of turning on the plurality of light sources.

FIG. 14 is a diagram showing an example of occurrence frequency of turning-on of the plurality of light sources 1.

As wind velocity disturbance or wind pressure disturbance increases in the Z-axis direction, the light emission number fluctuation data generating circuit 6 determines fluctuation and operates as shown in FIG. 14, from the data output occurrence frequency shown in FIG. 8, for example. Since disturbance input increases in the Z-axis direction, the leaf-filtered sunlight light source control module 3 performs control fluctuating so that the number of light emissions or light emission width frequently changes up to +2 on the positive side of the number of light emissions or light emission width with respect to the position of "0" shown in FIG. 7 as the center, frequently changes down to −2 on the negative side, and the state where the number of light emissions or light emission width changes does not occur at the position of "0". In this manner, the leaf-filtered sunlight simulation control device 100 simulates fluctuation in which objects shielding sunlight frequently greatly sway and frequency of occurrence of fixed states is low.

Figure 15:
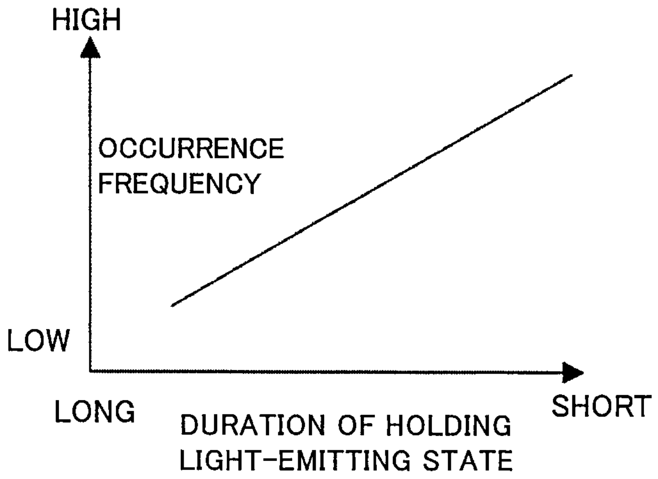
FIG. 15 is a graph schematically showing a relationship between the duration of holding a light-emitting state and occurrence frequency.

FIG. 15 is a graph schematically showing a relationship between the duration of holding the light-emitting state and occurrence frequency.

As wind velocity disturbance or wind pressure disturbance increases in the X-, Y-, and Z-directions, the lighting hold time fluctuation data generating circuit 5 determines data output occurrence frequency and operates as shown in FIG. 15, from data output occurrence frequency shown in FIG. 9, for example. With control performed so that a state where the time of keeping the light-emitting state is short frequently occurs and a state where the time of keeping the light-emitting state is long less frequently occurs, it is possible to simulate a situation in which a state where a period of sway of objects shielding sunlight (e.g., branches or leaves of trees) is short (i.e., a state where the objects move vigorously) is a steady state and a state where a period of sway of the objects shielding sunlight is long (i.e., a state where the objects move slowly) is less likely to occur.

Figure 16:
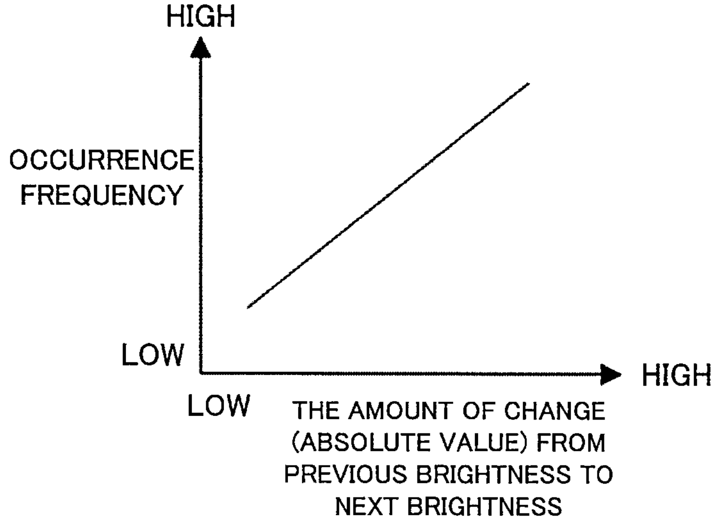
FIG. 16 is a graph schematically showing a relationship between the amount of change (absolute value) from previous brightness to next brightness and occurrence frequency.

FIG. 16 is a graph schematically showing a relationship between the amount of change (absolute value) from previous brightness to next brightness and occurrence frequency.

As wind velocity disturbance or wind pressure disturbance increases in the X-, Y-, and Z-directions, the light source luminance fluctuation data generating circuit 8 determines data output occurrence frequency and operates as shown in FIG. 16, from data output occurrence frequency shown in FIG. 11, for example. Regarding light source luminance fluctuation data in which brightness is updated at the timing of output of the lighting hold time fluctuation data generating circuit 5, as the amount of change of the absolute value from previous brightness before update to next brightness after update increases, higher occurrence frequency is set, whereas as the amount of change of the absolute value decreases, lower occurrence frequency is set. It is possible to simulate a situation in which objects shielding sunlight (e.g., branches or leaves of trees) move in a wide range and the movement cycle becomes faster because of disturbance, the amount of light beams diffused from sunlight or the amount of luminous change increases.

As described above, in this embodiment, in the case where correction is performed so that a turning-on time holding fluctuation data range is short, light emission turning-on order fluctuation data is large, a light emission number fluctuation data range is large, and a light source luminance fluctuation data range is large depending on the input level (e.g., strength of wind), for example, a situation in which sunshine filtering through the leaves vigorously changes with strong wind can be simulated.

Fifth Embodiment

Figure 17:
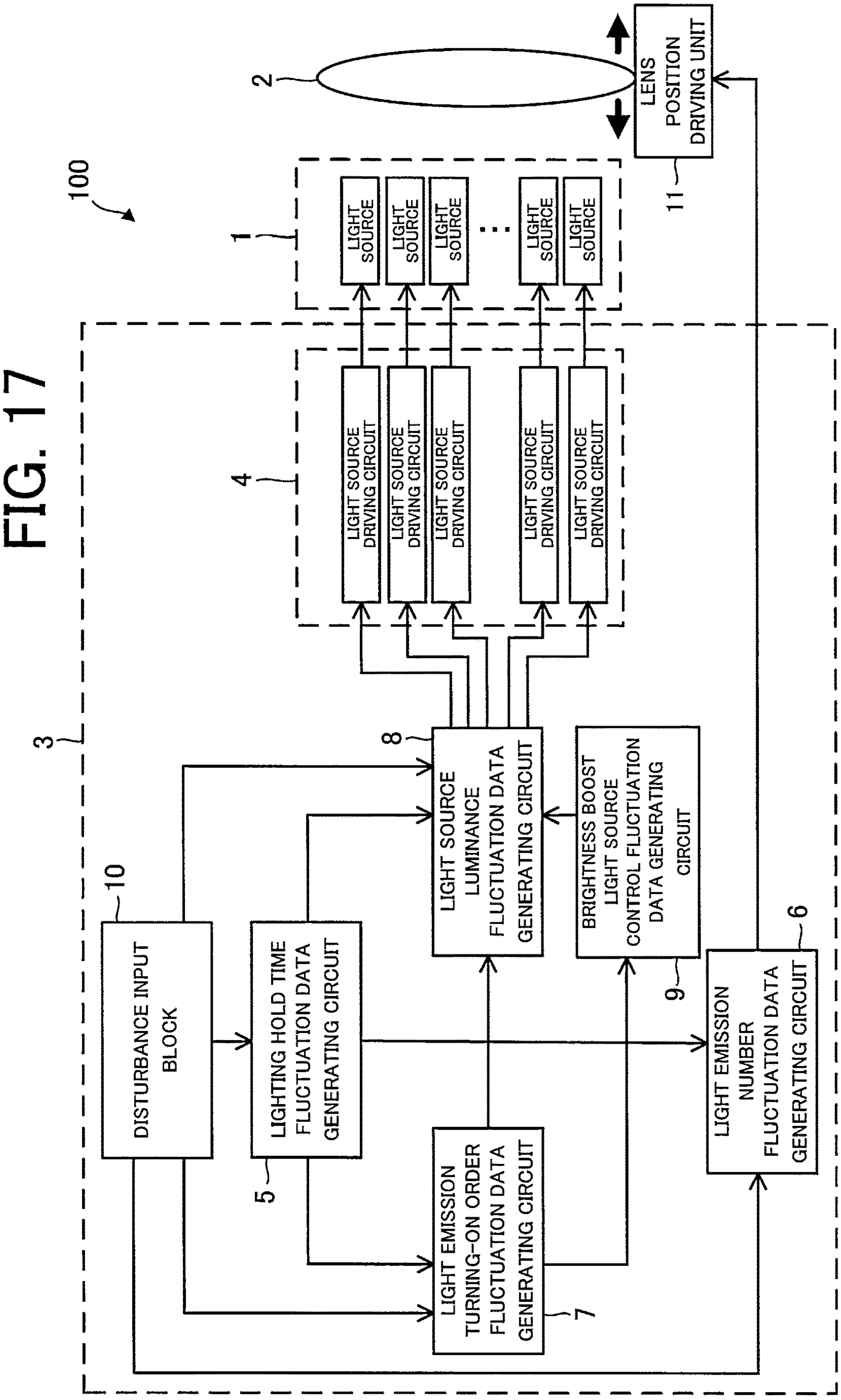
FIG. 17 is a block diagram schematically illustrating a configuration of a leaf-filtered sunlight simulation control device according to a fifth embodiment of the present disclosure.

FIG. 17 is a block diagram schematically illustrating a configuration of a leaf-filtered sunlight simulation control device 100 according to a fifth embodiment of the present disclosure.

In the fifth embodiment, the leaf-filtered sunlight simulation control device 100 includes a lens position driving unit 11 in addition to a plurality of light sources 1, a lens 2, and a leaf-filtered sunlight light source control module 3.

The leaf-filtered sunlight simulation control device 100 according to the fifth embodiment is different from the leaf-filtered sunlight simulation control device 100 according to the fourth embodiment in including the lens position driving unit 11.

The lens position driving unit 11 holds the position of the lens 2 and adjusts the distance between the lens 2 and the plurality of light sources 1. The lens position driving unit 11 includes, for example, driving circuitry capable of adjusting the position of the lens 2. The lens position driving unit 11 may be, for example, a motor such as a linear motor capable of adjusting the position of the lens 2.

The light emission turning-on order fluctuation data generating circuit 7 outputs an instruction for controlling turning on and off the plurality of light sources 1 to the light source luminance fluctuation data generating circuit 8 and the brightness boost light source control fluctuation data generating circuit 9. An output from the light emission turning-on order fluctuation data generating circuit 7 is input to the light source luminance fluctuation data generating circuit 8 and the brightness boost light source control fluctuation data generating circuit 9.

An output from the brightness boost light source control fluctuation data generating circuit 9 is input to the light source luminance fluctuation data generating circuit 8, and an output from the light source luminance fluctuation data generating circuit 8 is input to the light source driving circuit 4. The light source driving circuit 4 is driven to turn on or off the plurality of light sources 1.

The lighting hold time fluctuation data generating circuit 5 determines and outputs the holding time of the state where the plurality of light sources 1 are on or off. An output from the lighting hold time fluctuation data generating circuit 5 is input to the light emission turning-on order fluctuation data generating circuit 7, the light emission number fluctuation data generating circuit 6, and the light source luminance fluctuation data generating circuit 8. In this manner, outputs from the light emission turning-on order fluctuation data generating circuit 7, the light emission number fluctuation data generating circuit 6, and the light source luminance fluctuation data generating circuit 8 are updated.

The leaf-filtered sunlight light source control module 3 corrects light emission turning-on order fluctuation data, light emission fluctuation data, and fluctuation data by using measurement data measured by the disturbance input block 10. Specifically, an output from the disturbance input block 10 is input to the light emission turning-on order fluctuation data generating circuit 7, the light emission number fluctuation data generating circuit 6, the lighting hold time fluctuation data generating circuit 5, and the light source luminance fluctuation data generating circuit 8, and used for correcting data generated in these circuits.

The leaf-filtered sunlight light source control module 3 outputs an instruction for adjusting the distance between the lens 2 and the plurality of light sources 1 to the lens position driving unit 11. That is, the leaf-filtered sunlight light source control module 3 controls the lens position driving unit 11. For example, an output from the light emission number fluctuation data generating circuit 6 is input to the lens position driving unit 11. In this manner, the lens position driving unit 11 adjusts the distance between the lens 2 and the plurality of light sources 1 based on the instruction from the leaf-filtered sunlight light source control module 3.

The distance between the lens 2 and the plurality of light sources 1 is controlled without control of the number of light-emitting light sources simulating leaf-filtered sunlight in the light emission number fluctuation data generating circuit 6. In this manner, a change of a leaf-filtered sunlight pattern as shown in FIG. 7, for example, can be simulated.

As described above, in this embodiment, the distance A between the light sources 1 and the lens 2 is controlled with the light emission number fluctuation data of the light sources 1 so that a change in distance between the light sources 1 and objects shielding the light sources 1 can be simulated and blurred sunshine filtering through the leaves can be simulated. In other words, the number of light emissions of the light sources 1 does not need to be directly controlled, and an analog change in light-emission area, not a digital change in light-emission number (i.e., light emission area), and thus, leaf-filtered sunlight can be more naturally simulated.

Features of the embodiments and variations described above can be combined.

DESCRIPTION OF REFERENCE CHARACTERS

1 light source, 2 lens, 3 leaf-filtered sunlight source control module, 4 light source driving circuit, 5 lighting hold time fluctuation data generating circuit, 6 light emission number fluctuation data generating circuit, 7 light emission turning-on order fluctuation data generating circuit, 8 light source luminance fluctuation data generating circuit, 9 brightness boost light source control fluctuation data generating circuit, 10 disturbance input block, 11 lens position driving unit, 100 leaf-filtered sunlight simulation control device.

What is claimed is:

1. A leaf-filtered sunlight simulation control device comprising:

a single lens;

a plurality of light sources arranged in parallel with a center axis, the center axis being orthogonal to an optical axis of the lens; and leaf-filtered sunlight light source control circuitry to control positions of the plurality of light sources, wherein the leaf-filtered sunlight light source control circuitry controls the positions of the plurality of light sources to satisfy $F<A$, where F is a focal length of the lens and A is a distance from the center axis to each of the light sources.

2. The leaf-filtered sunlight simulation control device according to claim 1, wherein $A \leq C$ and $(A \times F)/(A-F)<(2 \times C \times F)/(C-F)$ are satisfied, where C is a distance from the center axis to each of the light sources.

3. The leaf-filtered sunlight simulation control device according to claim 1, wherein the leaf-filtered sunlight light source control circuitry includes light emission turning-on order fluctuation data for determining a turning-on order or a turning-off order of the plurality of light sources, light emission fluctuation data for determining one or more light sources to be turned on among the plurality of light sources, and fluctuation data for determining how long the plurality of light sources are turned on or off, the leaf-filtered sunlight light source control circuitry controls the turning-on order or the turning-off order of the light sources by using the light emission turning-on order fluctuation data, controls the one or more light sources to be turned on by using the light emission fluctuation data, and controls how long the plurality of light sources are turned on or off by using the fluctuation data.

4. The leaf-filtered sunlight simulation control device according to claim 1, wherein the leaf-filtered sunlight light source control circuitry changes a luminance of each of the light sources at a first timing, and increases the luminance of one of the light sources at a second timing different from the first timing to a luminance higher than a highest luminance at the first timing.

5. The leaf-filtered sunlight simulation control device according to claim 3, wherein the leaf-filtered sunlight light source control circuitry includes a disturbance input block to measure a wind velocity or a wind pressure, and the leaf-filtered sunlight light source control circuitry corrects the light emission turning-on order fluctuation data, the light emission fluctuation data, and the fluctuation data by using measurement data measured by the disturbance input block.

6. The leaf-filtered sunlight simulation control device according to claim 4, wherein the leaf-filtered sunlight light source control circuitry includes a disturbance input block to measure a wind velocity or a wind pressure, and the leaf-filtered sunlight light source control circuitry corrects the luminance of each of the light sources that changes at the first timing, by using measurement data measured by the disturbance input block.

7. The leaf-filtered sunlight simulation control device according to claim 1, further comprising a lens position driving circuitry to adjust a distance between the lens and the plurality of light sources, wherein the lens position driving circuitry adjusts the distance between the lens and the plurality of light sources based on an instruction from the leaf-filtered sunlight light source control circuitry.

8. The leaf-filtered sunlight simulation control device according to claim 1, further comprising a motor to adjust a distance between the lens and the plurality of light sources, wherein the motor adjusts the distance between the lens and the plurality of light sources based on an instruction from the leaf-filtered sunlight light source control circuitry.

9. The leaf-filtered sunlight simulation control device according to claim 2, wherein the leaf-filtered sunlight light source control circuitry includes light emission turning-on order fluctuation data for determining a turning-on order or a turning-off order of the plurality of light sources, light emission fluctuation data for determining one or more light sources to be turned on among the plurality of light sources, and fluctuation data for determining how long the plurality of light sources are turned on or off, the leaf-filtered sunlight light source control circuitry controls the turning-on order or the turning-off order of the light sources by using the light emission turning-on order fluctuation data, controls the one or more light sources to be turned on by using the light emission fluctuation data, and controls how long the plurality of light sources are turned on or off by using the fluctuation data.

10. The leaf-filtered sunlight simulation control device according to claim 2, wherein the leaf-filtered sunlight light source control circuitry changes a luminance of each of the light sources at a first timing, and increases the luminance of one of the light sources at a second timing different from the first timing to a luminance higher than a highest luminance at the first timing.

* * * * *